United States Patent
Meeker et al.

(10) Patent No.: US 6,529,305 B1
(45) Date of Patent: Mar. 4, 2003

(54) OPTICAL TRANSMISSION APPARATUSES, METHODS, AND SYSTEMS

(75) Inventors: Derek W. Meeker, Columbia, MD (US); Alistair J. Price, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/900,328

(22) Filed: Jul. 6, 2001

Related U.S. Application Data

(63) Continuation-in-part of application No. 09/544,482, filed on Apr. 7, 2000, now Pat. No. 6,426,821, which is a continuation of application No. 09/185,820, filed on Nov. 4, 1998, now Pat. No. 6,118,566.
(60) Provisional application No. 60/216,112, filed on Jul. 6, 2000.

(51) Int. Cl.[7] ............................................. H04B 10/00
(52) U.S. Cl. ..................... 359/161; 359/154; 359/180; 359/181; 359/188; 359/189; 359/173; 327/362; 385/88; 385/89; 385/90; 385/91; 385/94
(58) Field of Search ....................... 359/180, 181, 359/161, 189, 173, 154, 188; 327/362; 385/88, 89, 90, 91, 94

(56) References Cited

U.S. PATENT DOCUMENTS

| | | |
|---|---|---|
| 3,699,480 A | 10/1972 | Mueller |
| 3,956,626 A | 5/1976 | Ross |
| 4,663,596 A | 5/1987 | Heeks |
| 4,666,255 A | 5/1987 | Taylor et al. |
| 4,684,215 A | 8/1987 | Shaw et al. |
| 4,830,444 A | 5/1989 | Cloonan et al. |
| 4,897,622 A | 1/1990 | Cheo et al. |
| 4,989,200 A | 1/1991 | Olshansky et al. |
| 5,101,450 A | 3/1992 | Olshansky |
| 5,111,322 A | 5/1992 | Bergano |
| 5,115,440 A | 5/1992 | Gysel et al. |
| 5,134,509 A | 7/1992 | Olshansky et al. |
| 5,152,696 A | 10/1992 | Krajewski et al. |
| 5,239,401 A | 8/1993 | Olshansky |
| 5,249,201 A | 9/1993 | Posner et al. |
| 5,278,923 A | 1/1994 | Nazarathy et al. |

(List continued on next page.)

FOREIGN PATENT DOCUMENTS

| | | |
|---|---|---|
| EP | 0484791 B1 | 12/1995 |
| JP | 04074034 | 3/1992 |
| JP | 1005661 A | 2/1998 |

OTHER PUBLICATIONS

Hall, K.L. et al., 100 Gb/s All–Optical Logic, OFC '98 Post–Deadline Paper PD5–1 to PD5–3.

Alferness, Rod C., et al., Dispersion Compensation by Active Predistorted Signal Syntheses, Aug. 1985, pp. 800–805, Journal of Lightwave Technology.

Iwashita, Katsushi, et al., Chromatic Dispersion Compensation in Coherent Optical Communications, Mar. 1990, pp. 367–374, Journal of Lightwave Technology.

Royset, A., et al., "Compensation of Optical Fibre Dispersion in the Electrical Domain for Transmission Systems with Direct Detection", Electronics Letters, Jan. 20, 1994, vol. 30, No. 2, pp. 152–153.

Johnstone, W. et al., Integrated Optical Frequency Translators, IEE Colloquim on Advances in Coherent Optic Devices and Technologies, pp. 211–216, Mar. 26, 1985.

*Primary Examiner*—Leslie Pascal
*Assistant Examiner*—Hanh Phan

(57) ABSTRACT

Apparatuses, systems, and methods which compensate for distortion of optical and electrical signals being transmitted by communications systems and components by changing the effective length of communications cables and waveguides.

16 Claims, 14 Drawing Sheets

U.S. PATENT DOCUMENTS

| | | | |
|---|---|---|---|
| 5,301,058 A | 4/1994 | Olshansky | |
| 5,304,945 A | 4/1994 | Myer | |
| 5,394,261 A | 2/1995 | Nakamura | |
| 5,418,637 A | 5/1995 | Kuo | |
| 5,432,632 A | 7/1995 | Watanabe | |
| 5,434,937 A | 7/1995 | Glance | |
| 5,446,574 A | 8/1995 | Djupsjobacka et al. | |
| 5,453,868 A * | 9/1995 | Blauvelt et al. | 359/173 |
| 5,526,159 A | 6/1996 | Gottwald | |
| 5,543,952 A | 8/1996 | Yonenaga et al. | |
| 5,555,118 A | 9/1996 | Huber | |
| 5,596,436 A | 1/1997 | Sargis et al. | |
| 5,734,493 A | 3/1998 | Jopson | |
| 5,777,771 A | 7/1998 | Smith | |
| 5,778,128 A | 7/1998 | Wildeman | |
| 5,781,673 A | 7/1998 | Reed et al. | |
| 5,787,211 A | 7/1998 | Gopalakrishnan | |
| 5,798,854 A | 8/1998 | Blauvelt et al. | |
| 5,801,871 A | 9/1998 | Madabhushi | |
| 5,812,294 A | 9/1998 | Wilson | |
| 5,850,305 A | 12/1998 | Pidgeon | |
| 5,870,213 A | 2/1999 | Ishikawa et al. | |
| 5,909,297 A | 6/1999 | Ishikawa et al. | |
| 5,917,638 A | 6/1999 | Franck et al. | |
| 5,930,414 A | 7/1999 | Fishman et al. | |
| 5,999,300 A | 12/1999 | Davies et al. | |
| 5,999,667 A | 12/1999 | Castoldi et al. | |
| 6,005,701 A | 12/1999 | Hardy et al. | |
| 6,046,838 A | 4/2000 | Kou et al. | |
| 6,068,411 A * | 5/2000 | Ando | 385/88 |
| 6,118,566 A | 9/2000 | Price | |
| 6,141,127 A | 10/2000 | Boivin et al. | |
| 6,226,296 B1 * | 5/2001 | Lindsey et al. | 370/401 |
| 6,253,004 B1 | 6/2001 | Lee et al. | |
| 6,253,007 B1 | 6/2001 | Laughlin | |
| 6,264,373 B1 | 7/2001 | Fujimori et al. | |
| 6,317,243 B1 * | 11/2001 | Price | 359/181 |

\* cited by examiner

OPTICAL TRANSMISSION APPARATUSES, METHODS, AND SYSTEMS

CROSS-REFERENCE TO RELATED APPLICATIONS

This application claims priority from U.S. Provisional Patent Application No. 60/216,112, filed Jul. 6, 2000, and is a continuation-in-part of U.S. patent application Ser. No. 09/544,482, filed Apr. 7, 2000 now U.S. Pat. No. 6,426,884 which is a continuation of U.S. patent application Ser. No. 09/185,820, filed Nov. 4, 1998, now U.S. Pat. No. 6,118,566, issued Sep. 12, 2000, all of which are incorporated by reference herein.

STATEMENT REGARDING FEDERALLY SPONSORED RESEARCH OR DEVELOPMENT

Not applicable.

FIELD OF THE INVENTION

The present invention is directed generally to the transmission of information in communication systems and components. More particularly, the invention relates to communication systems and components which compensate for distortion of signals being transmitted by the systems and components.

BACKGROUND OF THE INVENTION

The development of digital technology provided resources to store and process vast amounts of information. While this development greatly increased information processing capabilities, it was soon recognized that in order to make effective use of information resources, it was necessary to interconnect and allow communication between information resources. Efficient access to information resources requires the continued development of information transmission systems to facilitate the sharing of information between resources.

The continued advances in information storage and processing technology has fueled a corresponding advance in information transmission technology. Information transmission technology is directed toward providing high speed, high capacity connections between information resources. One effort to achieve higher transmission capacities has focused on the development of optical transmission systems for use in conjunction with high speed electronic transmission systems. Optical transmission systems employ optical fiber networks to provide high capacity, low error rate transmission of information over long distances at a relatively low cost.

The transmission of information over fiber optic networks is performed by imparting the information in some manner to a lightwave carrier by varying the characteristics of the lightwave. The lightwave is launched into the optical fiber in the network to a receiver at a destination for the information. At the receiver, a photodetector is used to detect the lightwave variations and convert the information carried by the variations into electrical form.

In most optical transmission systems, the information is imparted by using the information data stream to either modulate a lightwave source to produce a modulated lightwave or to modulate the lightwave after it is emitted from the light source. The former modulation technique is known as "direct modulation", whereas the latter is known as "external modulation", i.e., external to the lightwave source. External modulation is more often used for higher speed transmission systems, because the high speed direct modulation of a source often causes undesirable variations in the wavelength of the source. The wavelength variations, known as chirp, can result in transmission and detection errors in an optical system.

Data streams can be modulated onto the lightwave using a number of different schemes. The two most common schemes are return to zero (RZ) and non-return to zero (NRZ). In RZ modulation, the modulation of each bit of information begins and ends at the same modulation level, i.e., zero, as shown in FIG. 1a. In NRZ schemes, the modulation level is not necessarily returned to a base modulation level, i.e., zero, at the end of a bit, but is directly adjusted to a level necessary to modulate the next information bit as shown in FIG. 1b. Other modulation schemes, such as duobinary and PSK, encode the data in a waveform, such as in FIG. 1c, prior to modulation onto a carrier.

In many systems, the information data stream is modulated onto the lightwave at a carrier wavelength, $\lambda_o$, (FIG. 2a) to produce an optical signal carrying data at the carrier wavelength, similar to that shown in FIG. 2b. The modulation of the carrier wavelength also produces symmetric lobes, or sidebands, that broaden the overall bandwidth of the optical signal. The bandwidth of an optical signal determines how closely spaced successive optical signals can be spaced within a range of wavelengths.

Alternatively, the information can be modulated onto a wavelength proximate to the carrier wavelength using subcarrier modulation ("SCM"). SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength (FIG. 2c). Generally, only one of the mirror images is required to carry the signal and the other image is a source of signal noise that also consumes wavelength bandwidth that would normally be available to carry information. Similarly, the carrier wavelength, which does not carry the information, can be a source of noise that interferes with the subcarrier signal. Modified SCM techniques have been developed to eliminate one of the mirror images and the carrier wavelength, such as described in U.S. Pat. Nos. 5,101,450 and 5,301,058.

Initially, single wavelength lightwave carriers were spatially separated by placing each carrier on a different fiber to provide space division multiplexing ("SDM") of the information in optical systems. As the demand for capacity grew, increasing numbers of information data streams were spaced in time, or time division multiplexed ("TDM"), on the single wavelength carrier in the SDM system as a means to provide additional capacity. The continued growth in transmission capacity has spawned the transmission of multiple wavelength carriers on a single fiber using wavelength division multiplexing ("WDM"). In WDM systems, further increases in transmission capacity can be achieved not only by increasing the transmission rate of the information via each wavelength, but also by increasing the number of wavelengths, or channel count, in the system.

There are two general options for increasing the channel count in WDM systems. The first option is to widen the transmission bandwidth to add more channels at current channel spacings. The second option is to decrease the spacing between the channels to provide a greater number of channels within a given transmission bandwidth. The first option currently provides only limited benefit, because most optical systems use erbium doped fiber amplifiers ("EDFAs") to amplify the optical signal during transmission. EDFAs have a limited bandwidth of operation and suffer from non-linear amplifier characteristics within the bandwidth. Difficulties with the second option include controlling optical sources that are closely spaced to prevent interference from wavelength drift and nonlinear interactions between the signals.

A further difficulty in WDM systems is that chromatic dispersion, which results from differences in the speed at which different wavelengths travel in optical fiber, can also degrade the optical signal. Chromatic dispersion is generally controlled in a system using one or more of three techniques. One technique to offset the dispersion of the different wavelengths in the transmission fiber through the use of optical components such as Bragg gratings or arrayed waveguides that vary the relative optical paths of the wavelengths. Another technique is intersperse different types of fibers that have opposite dispersion characteristics to that of the transmission fiber. A third technique is to attempt to offset the dispersion by prechirping the frequency or modulating the phase of the laser or lightwave in addition to modulating the data onto the lightwave. For example, see U.S. Pat. Nos. 5,555,118, 5,778,128, 5,781,673 or 5,787,211. These techniques require that additional components be added to the system and/or the use of specialty optical fiber that has to be specifically tailored to each length of transmission fiber in the system.

New fiber designs have been developed that substantially reduce the chromatic dispersion of WDM signals during transmission in the 1550 nm wavelength range. However, the decreased dispersion of the optical signal allows for increased nonlinear interaction, such as four wave mixing, to occur between the wavelengths that increases signal degradation. The effect of lower dispersion on nonlinear signal degradation becomes more pronounced at increased bit transmission rates.

A further difficulty in WDM systems is that the signal bit rates are very high and, as a result, electrical cables and optical waveguides need to be precise and uniform in their length and distortion characteristics. However, it is difficult and expensive to manufacture cables and waveguides to such tolerances. One approach to solving this problem has been to manufacture cables and waveguides in varying lengths and to use a "trial and error" process to find a cable or waveguide that meets the particular needs of a system or component. Such difficulties limit the bit rate of systems and components.

The many difficulties associated with increasing the number of wavelength channels in WDM systems, as well as increasing the transmission bit rate, have slowed the continued advance in communications transmission capacity. In view of these difficulties, there is a clear need for transmission techniques and systems that provide for higher capacity, longer distance optical communication systems.

BRIEF SUMMARY OF THE INVENTION

Apparatuses and methods of the present invention address the above need by providing optical communication systems and components including distortion elements that can provide for dispersion compensation, compensation for other distortion and non-uniformities in the system and components, and/or nonlinear management in the system. In an embodiment, one or more distortion elements are used to compensate for distortions and non-uniformities in electrical cables and optical waveguides. The present invention also includes systems which include one or more distortion elements according to the teachings herein. Furthermore, the present invention includes methods of operating, designing, and assembling a system using the methods described herein.

The distortion elements can change the effective length of the electrical cable or optical waveguide. As a result, the distortion elements can be used to fine tune a component or system to compensate for cables or waveguides that are not sufficiently precise in their length or in some other signal distorting characteristic. For example, if two or more cables need to be the same length so that signals carried by those cables arrive at their destination at the same time, the distortion elements can be used to change the effective length of the cables to provide sufficient precision for the systems and/or components to operate properly.

The distortion elements may be provided in varying sizes, allowing for varying effects on the cable or waveguide with which the distortion element is used. In that manner, it is no longer necessary to manufacture a particular cable or waveguide in varying lengths in order compensate for the imprecision in manufacturing the cable or waveguide. Furthermore, the present invention allows for assembly of systems and components to be performed more quickly and more easily, thereby decreasing the time and cost associated with installing the systems and components.

Accordingly, the present invention addresses the aforementioned problems with providing increased transmission performance of optical systems. These advantages and others will become apparent from the following detailed description.

BRIEF DESCRIPTION OF THE DRAWINGS

Embodiments of the present invention will now be described, by way of example only, with reference to the accompanying drawings, wherein.

DETAILED DESCRIPTION OF THE INVENTION

The operation of the present invention will be described generally with reference to the drawings for the purpose of illustrating present embodiments only and not for purposes of limiting the same.

Figure 1A:
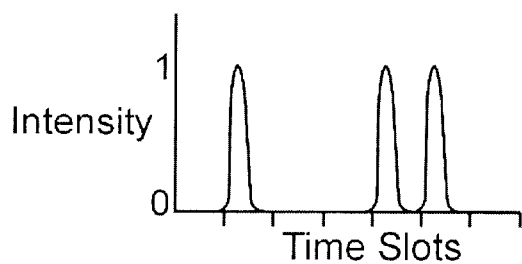
FIGS. 1a–c show a typical baseband return to zero ("RZ") and non-return to zero ("NRZ") data signal.
Figure 2A:
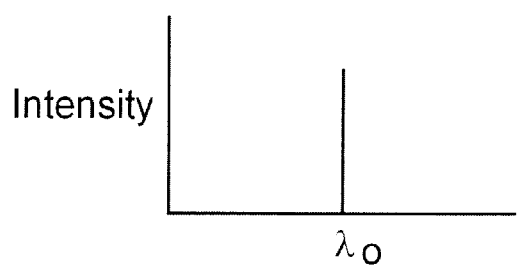
FIGS. 2a–c show the intensity versus wavelength plots for an unmodulated optical carrier, modulated carrier, and modulated subcarriers of the carrier.
Figure 1B:
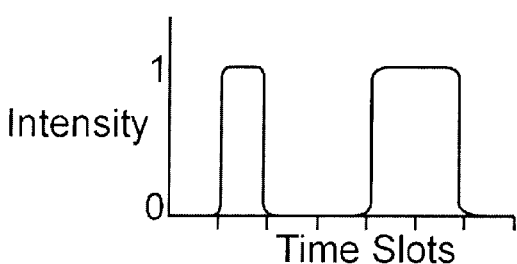
Figure 2B:
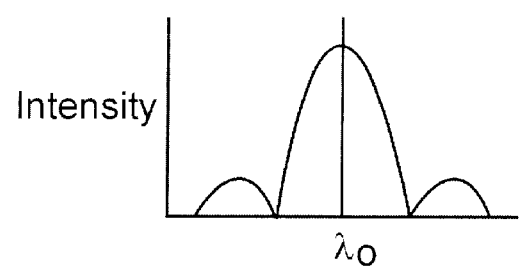
Figure 1C:
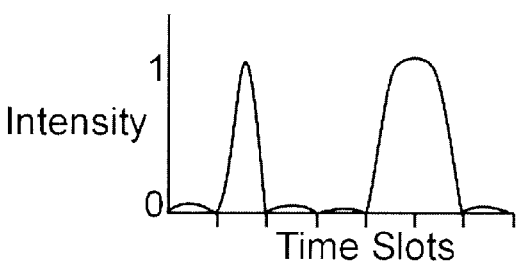
Figure 2C:
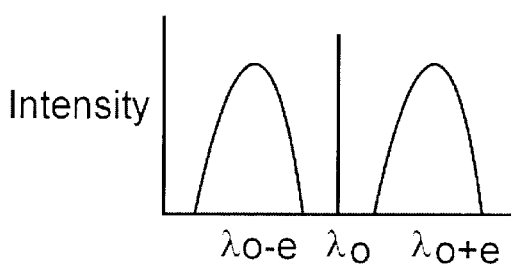
Figure 3A:
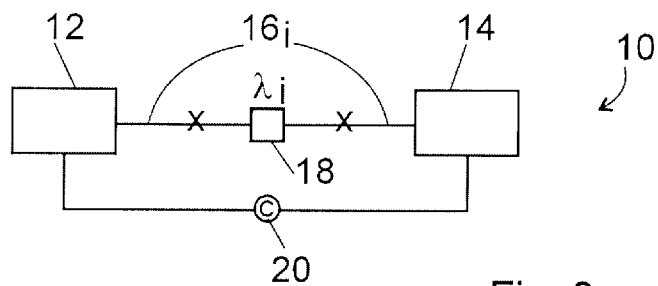
FIGS. 3a, 3b, and 4 show embodiments of the system of the present invention.
Figure 3B:
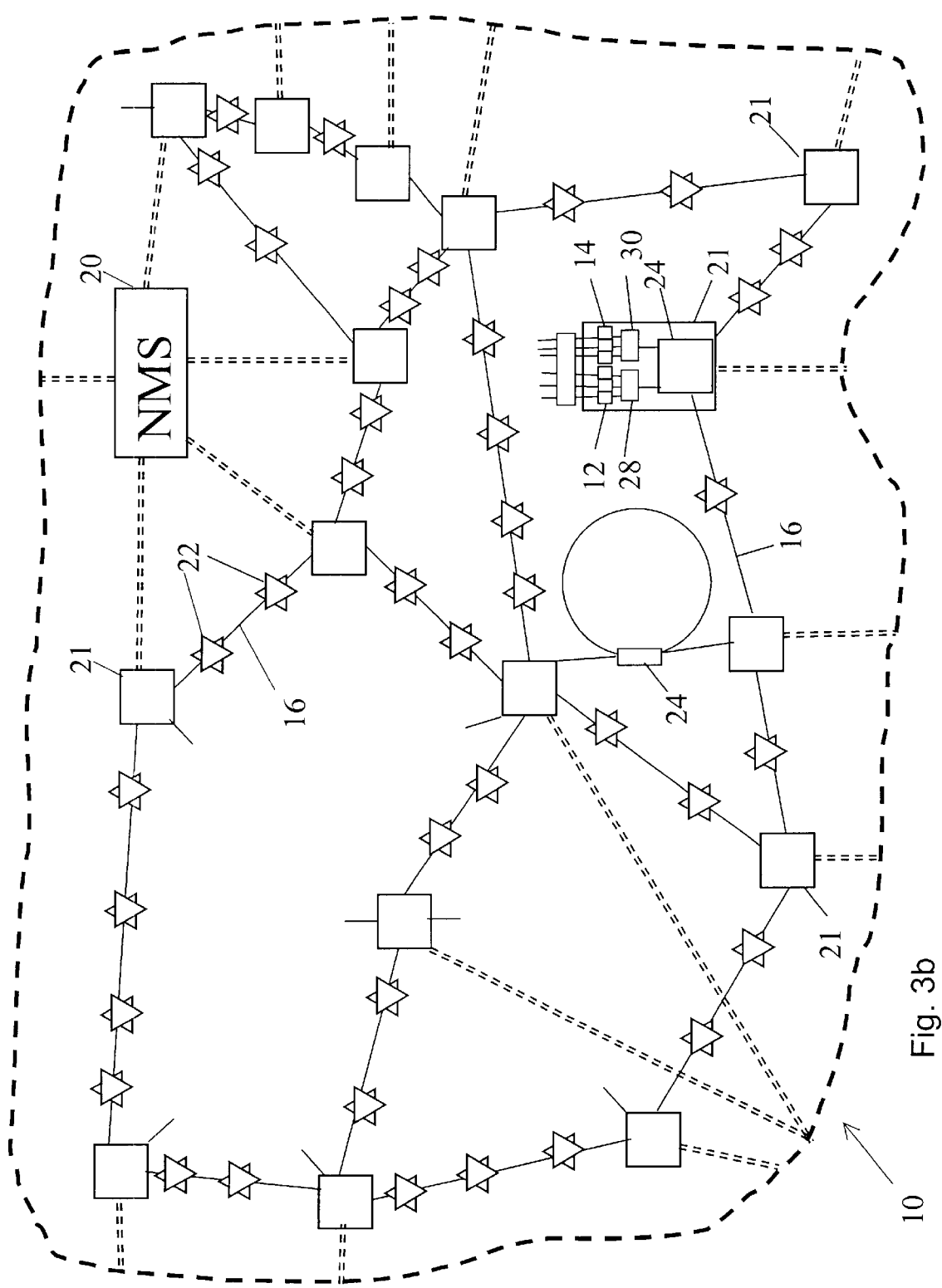

FIG. 3a is a schematic of a point to point optical system according to one embodiment of the present invention. FIG. 3b is a schematic of a multi-dimensional network. In the illustrated embodiments, the system 10 includes an optical transmitter 12, an optical receiver 14, one or more segments of optical waveguide 16, a dispersion compensating component 18, such as dispersion compensating fiber, and a controller or a network management system 20. The system illustrated in FIG. 3b shows nodes 21, which may include one or more transmitters, receivers, and other components as will be described in more detail below. The system 10, of course, may include more or less components than those illustrated in FIGS. 3a and 3b.

The optical transmitter 12 and the optical receiver 14 are configured to communicate with each other. The transmitter 12 transmits information (i.e., data, etc.), and the receiver 14 receives the information, at one or more information carrying optical wavelengths $\lambda_i$ via the optical fiber 16.

The transmitter 12 can be configured to electrically distort an electrical data signal to compensate for chromatic dispersion that occurs as an optical signal $\Lambda_o$ carrying the data is transmitted through the optical fiber $16_i$. The electronic data signal $\Lambda_E$ can be in a baseband $\Lambda_B$ (i.e., binary, direct current), coded $\Lambda_c$, or a modulated electrical carrier $\Lambda_e$ format.

The transmitter 12 and receiver 14 can interface directly with other optical or electrical systems and components, such as electrical transmission systems, or they can interface via optical or electrical switches or interfaces to other optical or electrical systems that operate using the same or different wavelengths.

The feedback controller 20 may be, for example, a processor, such as a general purpose processor or an application specific integrated circuit. The feedback controller 20 receives feedback from one or both of the transmitter 12 and receiver 14, or from other elements of the system 10, and makes adjustments to the system 10 in response to that feedback.

The system 10 may also include other components, such as optical amplifiers 22, add/drop devices 24, and the like, some of which are illustrated in the subsequent figures.

Figure 4:
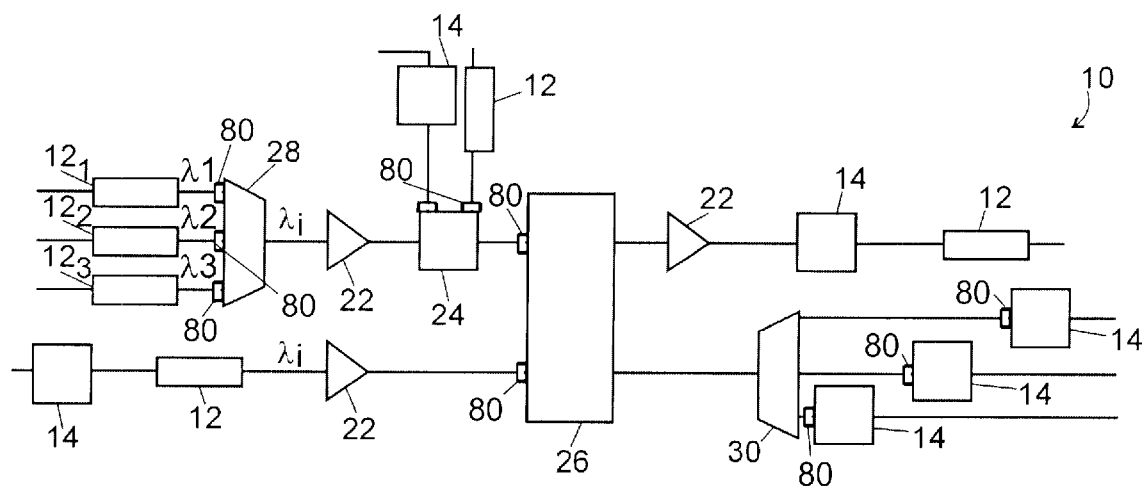

FIG. 4 illustrates another embodiment of the present invention wherein the system 10 is embodied as a network including a plurality of transmitters 12 and receivers 14 in optical communication through one or more optical amplifiers 22, add/drop devices 24, optical and/or electrical switches 26, combiners 28, and/or distributors 30. For example, optical and electrical cross connect switches and routers, multiplexers, splitters, and demultiplexers can be employed in the system 10. The system may also include one or more signal distortion elements 80.

The signal distortion elements 80 may be used to supplement or compliment other signal distortion devices, such as the signal distorter 32 discussed hereinbelow with respect to FIG. 5, or to introduce distortion independent of other devices. The distortion elements 80 may be used with either optical waveguides or electrical cables. The distortion elements 80 can be used to change the effective length of a cable or waveguide. As a result, the distortion element 80 can be used to fine tune a system or component, or to compensate for imperfections in components. For example, the distortion elements 80 can be used to compensate for slight differences in waveguide or cable lengths and/or properties. Compensating for such differences can be particularly important where multiple cables and waveguides originate from or terminate with a common component or device. In such an application, one or more distortion elements 80 may be connected in series with one or more of cables or waveguides, so as to equalize and/or compensate for the distortion and/or non-uniformities introduced by the cables or waveguides. The distortion elements 80 may also be used in a single cable or waveguide, such as when it is desirable to tune the reception of a signal, such as by applying a phase shift and/or a time delay. The distortion element 80 is discussed in more detail with respect to FIGS. 18–21.

Figure 5:
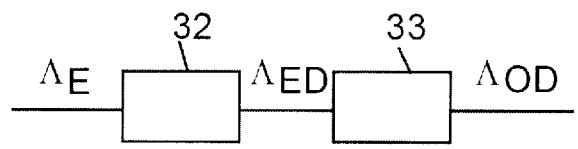
FIG. 5 shows an embodiment of a transmitter of the present invention.

FIG. 5 illustrates an embodiment of the transmitter 12 including an electronic signal distorter 32 and an electrical to optical converter 33.

The signal distorter 32 receives an electrical data signal $\Lambda_E$ and is configured to produce a distorted electrical signal $\Lambda_{ED}$. The distortion of the electronic data signal $\Lambda_E$ is generally in the form of an electronically induced time delay. Because dispersion is a function of optical wavelength, the distortion of the electronic data signal $\Lambda_E$ may also vary as a function of the optical wavelength $\lambda_i$ onto which each distorted electrical signal $\Lambda_E$ is being imparted. When more than one optical wavelength is being used $\lambda_i$ a group delay can be used to provide varying amounts of dispersion compensation, or distortion, for each wavelength. Furthermore, dispersion is also affected by the bit rate of the transmission and, accordingly, the distortion introduced into the electronic data signals $\Lambda_E$ may be varied for the bit rate. The distortion characteristics can be controlled to provide linear and nonlinear, positive and negative, and constant and varying distortion profiles with respect to the wavelength of the signal.

The electrical to optical converter 33 receives the distorted electrical signal $\Lambda_{ED}$ and produces an optical signal $\Lambda_{OD}$ indicative thereof. The electrical to optical converter 33 may impart the electrical signal $\Lambda_{ED}$ onto an optical carrier lightwave $\Lambda_O$ by, for example, upconverting the electrical signal $\Lambda_{ED}$ onto a subcarrier lightwave of an optical carrier lightwave $\Lambda_O$ provided by an optical source 34. Alternatively, the conversion of electrical signal $\Lambda_{ED}$ can be performed by directly modulating the optical source 34. In another embodiment, the conversion can be performed by externally modulating the optical carrier lightwave $\Lambda_O$ to produce the optical data signal at the carrier frequency.

The optical source 34 may be, for example, one or more signal lasers or light emitting diodes, or other appropriate coherent or non-coherent optical sources as may be known in the art. The optical source 34 may be external to or incorporated into the optical to electrical converter 33.

Figure 6A:
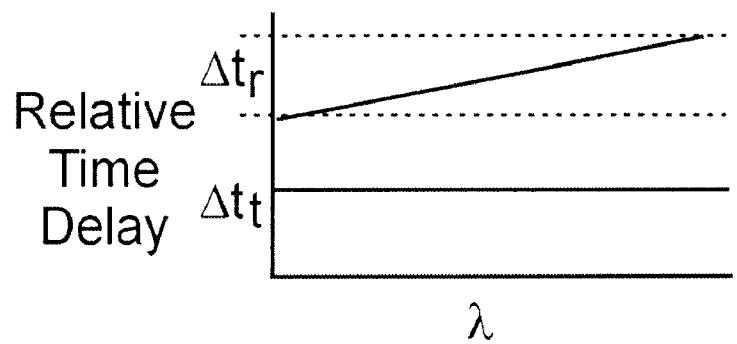
FIGS. 6a and 6b show transmission & reception time versus wavelength curves.
Figure 6B:
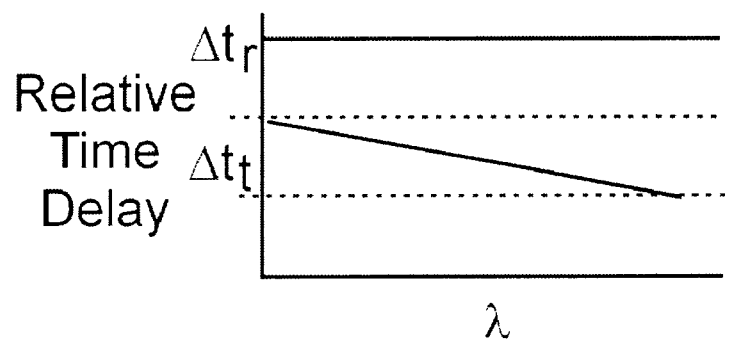
Figure 6C:
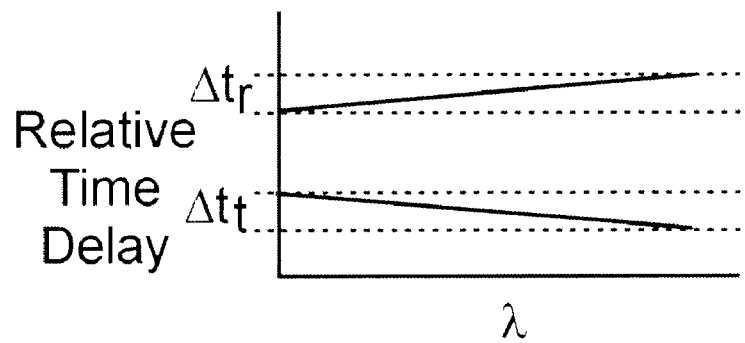

FIGS. 6a, 6b, and 6c illustrate relative time delays as a function of wavelength for transmitted signals $\Delta t_t$ and for received signals $\Delta t_r$.

FIG. 6a illustrates typical relative time delay for an optical signal being transmitted without intentional distortion. In that example, although all of the wavelengths are transmitted at the same time, the reception of the wavelengths varies as a function of wavelength. Dispersion of the signal during transmission results in the different wavelengths in the signal reaching the receiver 14 at different times during a reception time interval, $\Delta t_r$. The time delay in signal reception is one source of signal distortion that degrades system performance.

FIG. 6b illustrates relative time delay according to one embodiment of the present invention in which the transmitted signal is intentionally distorted as a function of wavelength such that all wavelengths of the received signal arrive at the receiver 14 at the same time. In that embodiment, distorted optical signals are produced by introducing distortion as a group delay function of frequency, which results in the signal being transmitted over a transmission time interval $\Delta t_r$. That distortion is offset by dispersion in the transmission path resulting in the different frequencies reaching the receiver 14 at the same reception time $t_r$.

FIG. 6c illustrates relative time delay according to another embodiment of the present invention in which the distortion is such that the receiver 14 receives the signal over a reception time interval. For example, it is typically not required that the transmitted signals reach the receiver 14 at the same time. As a result, the signal can be distorted to compensation for dispersion in the optical waveguide 18, and through such compensation the waveguide 18 can be lengthened without resulting in any more signal distortion than in the shorter signal span. In that way, the present invention may be used to reduce the number of receivers 14, transmitters 12, and other components necessary to transmit data over long distances, thereby reducing the cost of transmitting those signals.

One skilled in the art will appreciate that in the present invention the distortion profile of the electronic data signal can be varied as desired to control the shape of optical signal at the receiver 14. For example, given the interrelation of chromatic dispersion and nonlinear interactions, the electrical distortion characteristics can be shaped to minimize the total distortion at the receiver 14 as opposed to minimizing only the chromatic dispersion. In addition, electronic dispersion compensation can be used in conjunction with dispersion compensating elements 18, such as negative dispersion slope fiber, grating-based elements, etc. as are known in the art.

Figure 7A:
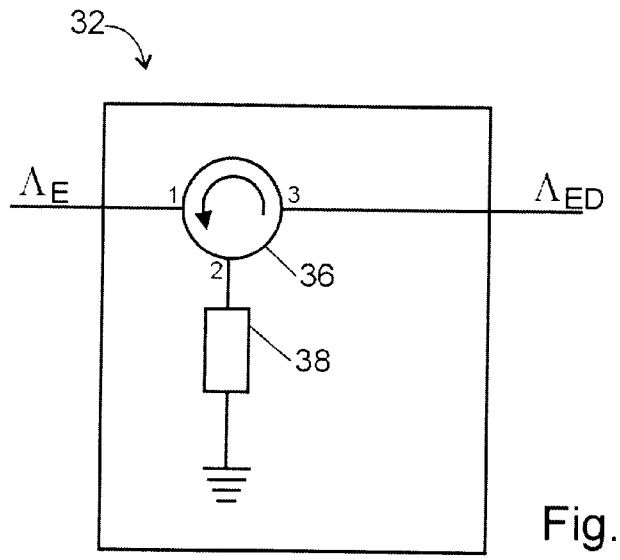
FIGS. 7a–c show embodiments of signal distorters of the present invention.
Figure 7B:
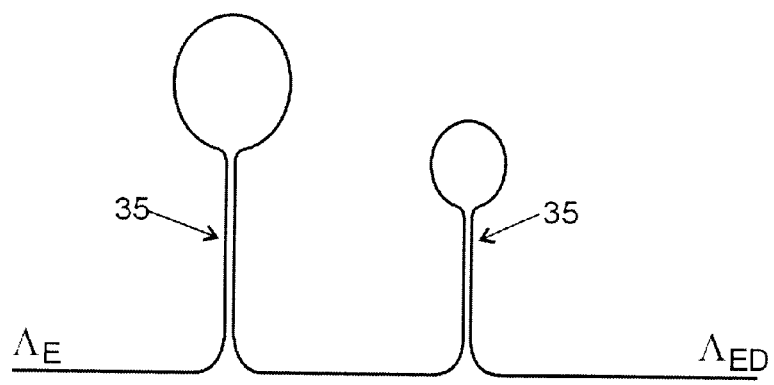
Figure 7C:
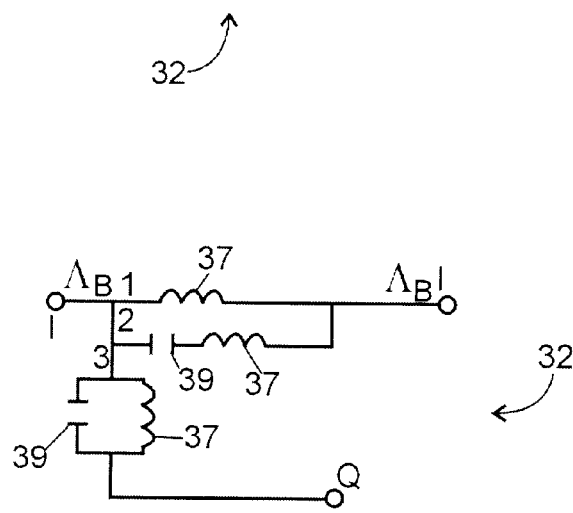

FIGS. 7a–c show embodiments of signal distorter 32 of the present invention. In FIG. 7a, the distorter 32 includes one or more serial electrical circulators 36 having an input to an input port 1 that circulates the electrical signal to an equalizer port 2. A resonator 38 can be connected to port 2 to serve as an all-pass transmission filter that reflects all incident power in a frequency dependent manner back to the port 2, thereby distorting signal. The distorted electrical signal $\Lambda_{ED}$ exits an output port 3 of the circulator 36 from which it can be passed into another distortion element or exit the signal distorter 32.

An example of resonators 38 that are suitable for use in the present invention are impedance resonators following the general equation:

$Z(s) = sL + 1/(sC)$ $L = RQ/(2\pi f_0)$ $C = 1/(4\pi^2 f_0^2 L)$ $H(s) = (Z(s) - R)/(Z(s) + R)$ $D(\omega) = -d/d_\omega (\arg(H(j_\omega)))$, where

| | | |
|---|---|---|
| Z = impedance | C = capacitance | D(ω) = group delay |
| L = inductance | f₀ = frequency | H(s) = equalizer |
| R = resistance | Q = Q factor | Transfer function |

One skilled in the art will appreciate that the circulator/resonator embodiments shown in FIG. 7a can be cascaded to provide desired group delay characteristics and that other networks may be used in the present invention.

FIG. 7b illustrates an embodiment of the signal distorter 32 including one or more electrical loop couplers 35 configured to introduce the desired group delay into the electrical carrier signal $\Lambda_e$. Various configurations of loop couplers suitable to achieve the desired group delay can be used in the distorter 32.

FIG. 7c illustrates an embodiment of the signal distorter 32 for distorting the baseband signal $\Lambda_B$. The distorter 32 is used to separate the baseband signal $\Lambda_B$ into I and Q components by configuring the inductors 37 and capacitors 39 to approximate the following general transfer function over the frequency range of interest:

$|H_I(j_\omega)|^2 + |H_Q(j_{107})|^2 = $ constant.

The amount of dispersion in optical fiber $16_i$ is generally well documented as a function of fiber length and optical wavelength. For example, transmission fiber can typically be in the range of 15–20 ps/nm/km in the 1550 nm wavelength range. Thus, the amount of distortion necessary to produce a desired dispersion profile at a point in the optical transmission system can be calculated and adjusted as may be necessary in the system 10. In addition, the shape of the distortion profile can be tailored to be linear or nonlinear functions of frequency to compensate for the interrelation of chromatic dispersion and nonlinear interactions.

Figure 8A:
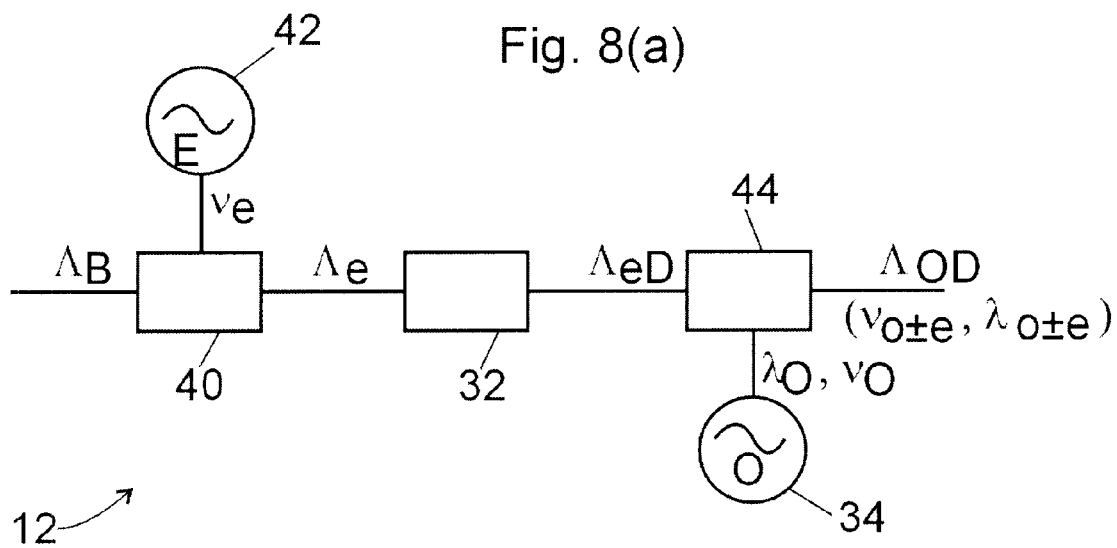
FIGS. 8–11 show embodiments of transmitters of the present invention.

FIG. 8a illustrates an embodiment of the transmitter 12 in which an electrical modulator 40 is used to modulate the baseband electric signal $\Lambda_B$ onto an electrical carrier at a frequency $v_e$ from an electrical carrier source 42. The modulator 40 can be a double balanced mixer as is known in the art. The electrical carrier signal $v_e$ will be of the general form $A(\sin(\omega + 100))$ and the baseband signal $\Lambda_E$ of the form V(t) resulting in an output signal of the general form $kV(t)A(\sin(\omega + \phi + \phi_1))$. Thus, if the mean of the baseband signal is zero, the carrier frequency will be suppressed. Likewise, if v(t) has essentially two state ±a, the output will be in PSK format.

The electrical carrier frequency can be any suitable frequency for the data rate being transmitted, for example, RF or microwave carriers. The signal distorter 32 receives the modulated electrical carrier signal $\Lambda_e$ at frequency $v_e$ and provides the distorted electrical carrier signal $\Lambda_{eD}$. An upconverter 44 combines the distorted modulated electrical carrier at $v_e$ with an optical lightwave carrier at a central wavelength $\lambda_o$ (frequency $v_o$) supplied by an optical source 34. The resulting distorted optical signal $\Lambda_{OD}$ has a frequency $v_o \pm v_e$ ("$v_{o \pm e}$") and central wavelength at $\lambda_{o \pm e}$, which is equal to $c/(v_o \pm v_e)$, where c is the speed of light.

Figure 8B:
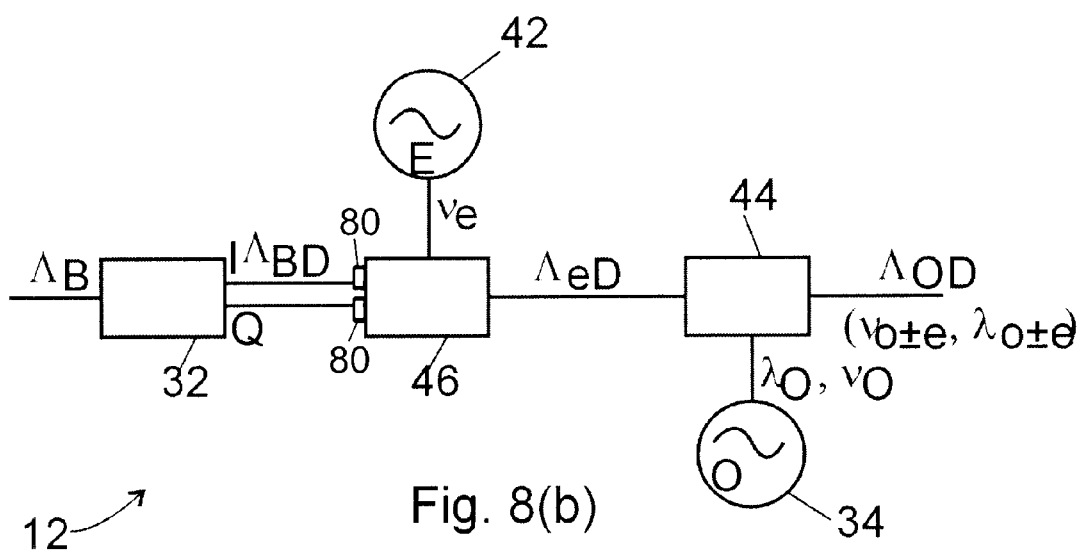

FIG. 8b illustrates another embodiment of the transmitter in which the baseband electrical signal $\Lambda_B$ is provided to the signal distorter 32, which is configured to separate the signal $\Lambda_B$ into in-phase ("I") and quadrature ("Q") components and distort the signal. The IQ components of the distorted electrical signal $\Lambda_{BD}$ are provided to an IQ modulator 46. The I and Q components are modulated onto the electrical carrier $v_e$ which is upconverted onto the optical carrier $v_o$ to produce the distorted optical signal $\Lambda_{OD}$ at the central wavelength at $\lambda_{o \pm e}$.

One or more signal distortion elements 80 may be included in the transmitter 12 to supplement or complement the signal distorter 32. The distortion elements 80 can introduce distortion into the I and Q components of the distorted electrical signals $\Lambda_{BD}$. That distortion can supplement the signal distorter 32 or it can fine tune or compensate for imperfections in other components. For example, the distortion elements 80 can be used to compensate for slight differences in cable lengths, such as between the cables carrying the I and Q components of the distorted electrical signals $\Lambda_{BD}$. In that example, one or more distortion elements 80 are in series with one or both of the electrical cables, so as to equalize and/or compensate for the distortion introduced by the cables.

Figure 9:
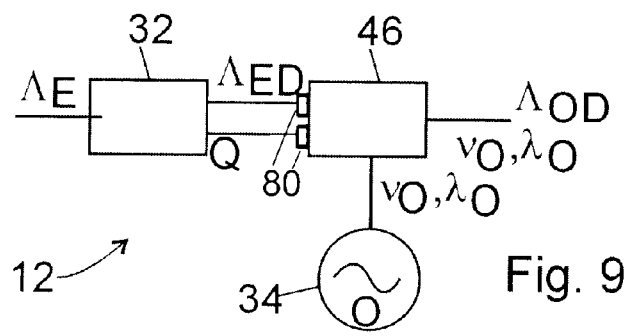

FIG. 9 illustrates another embodiment of the transmitter 12 wherein the I and Q components are modulated onto the optical carrier having a central wavelength $\lambda_o$ and frequency $v_o$ to provide the distorted optical signal $\Lambda_{OD}$ having the same central wavelength at $\lambda_o$.

Figure 10:
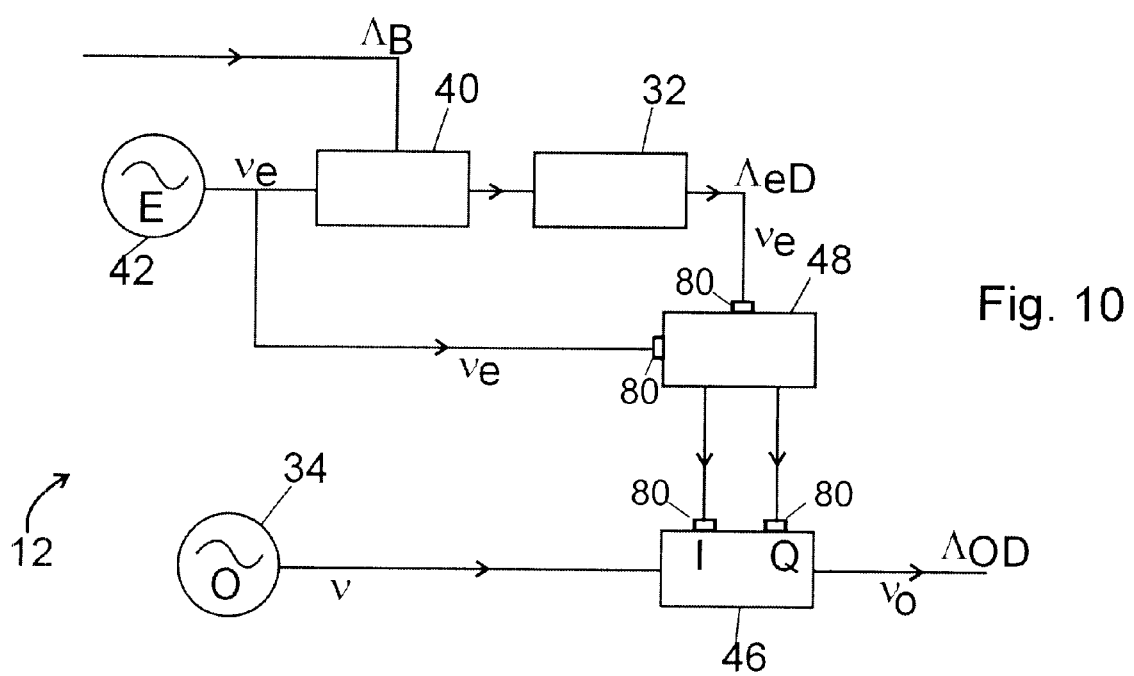

FIG. 10 illustrates an embodiment of the transmitter in which the baseband signal $\Lambda_B$ is modulated onto a portion of the electrical carrier $v_e$, which is passed through the signal distorter 32 to produce the distorted electrical signal $\Lambda_{eD}$. Another portion of the electrical carrier $v_e$ is provided as input along with the distorted electrical signal $\Lambda_{eD}$ to an IQ demodulator 48, which separates the distorted electrical signal $\Lambda_{eD}$ into its IQ components. The IQ components of the electronic signal are provided to the IQ modulator 46 which modulates the data onto the optical carrier at the central wavelength $\lambda_o$ and frequency $v_o$ provided by the optical source 34.

Figure 11:
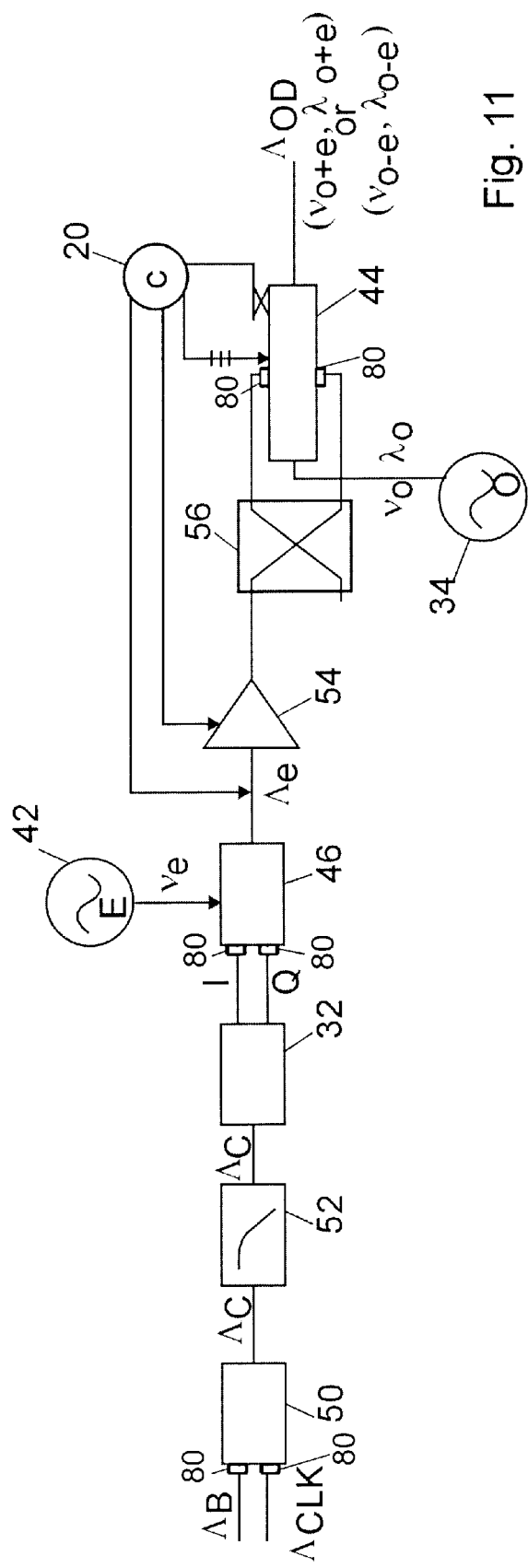

FIG. 11 illustrates an embodiment of the transmitter in which the electrical baseband signal $\Lambda_B$ can be encoded along with a clock signal $\Lambda_{CLK}$ using a data encoder 50 to provide an encoded data signal $\Lambda_c$. The encoded data signal $\Lambda_c$ may be further passed through a filter 52, such as a low pass filter, to shape the signal before being passed to the signal distorter 32. In the transmitter 12, the IQ modulator 46 can be used to modulate the distorted electrical signal onto the electrical carrier frequency $v_e$. The electrical carrier can be amplified using an electrical amplifier 54, split through electrical coupler 56, and upconverted onto the optical carrier to produce the distorted optical signal $\Lambda_{OD}$ having its center wavelength at $\lambda_{o\pm e}$. One of the controllers 20 in the system 10 can be used to provide feedback control of the upconverter 44, as well as the other components such as the amplifier 54.

The electrical coupler 56 is used to split the signal from each input path between two output paths and impart a phase shift, i.e. 90° in a 2×2 3 dB coupler, between signals on the respective output paths. The phase shift between the two output paths depends upon which input path the signal was introduced. Thus, the frequency of the resulting distorted optical signal $\Lambda_{OD}$ will be either $v_{o+e}=v_o+v_e$ or $v_{o-e}=v_o-v_e$ depending upon which input of the coupler 56 the electrical signals are introduced.

Data encoding techniques, such as duobinary, QPSK, and others, are useful to decrease the bandwidth of the resulting optical signal. These formats can also affect the extent of distortions that arise from signal dispersion and non-linear interaction between the signals. The detection of duobinary and other differential PSK-type signals using direct detection can be enhanced using an optical filter 58 before the receiver 14 in the optical system 10. The optical filter 58 can be matched, i.e., comparably shaped, to the received optical spectrum of the signal, which can be controlled in the present invention using the electrical filter 52. The optical filter 58 can be a Fabry-Perot filter or other appropriate filter as may be known in the art. The electrical filter 52 can be design to account for and match the properties of the optical filter 58 so as to minimize the bandwidth of the optical signal. It will be appreciated that the electrical filter 52 can be positioned at different locations within the transmitter 12 and modified accordingly.

Figure 12:
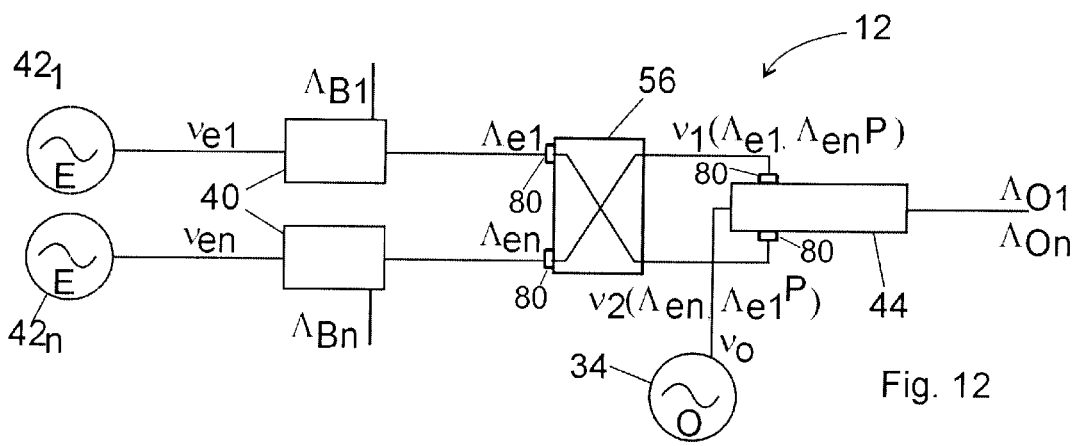
FIG. 12 shows an embodiment of transmitters of the invention.

FIG. 12 illustrates another embodiment of the invention in which the transmitter 12 is used to simultaneously upconvert a plurality of electrical signals $\Lambda_{En}$ onto one optical carrier. A plurality of baseband electrical signals $\Lambda_{B1}$–$\Lambda_{Bn}$ are modulated onto a corresponding plurality on electrical carriers provided by sources $42_1$–$42_n$ to provide modulated electrical carriers. Signal distorters 32 can be provided to distort either the baseband signal or the modulated electrical carrier, if dispersion compensation is desired. The modulated electrical carriers are passed through the electrical coupler 56, which divides the electrical signals between the two output paths leading to the upconverter 44.

Numerous combinations of electrical carriers can be upconverted using the transmitter configuration of FIG. 12. For example, electrical sources $42_1$ through $42_n$ can provide the same or different electrical carrier frequencies and depending upon how the carriers are coupled into the upconverter 44. If more than two electrical carriers are to be upconverted using the same upconverter 44, the additional carriers can be combined, or multiplexed, onto the appropriate coupler input. The resulting optical signal can be produced at longer or shorter wavelengths than the optical carrier wavelength $\lambda_o$ as previously discussed. In addition, it may also be possible to use one or more electrical subcarriers to carry additional data along with, or in lieu of, data on the electrical carrier frequency depending upon the electrical subcarrier frequency spacings.

Figure 13:
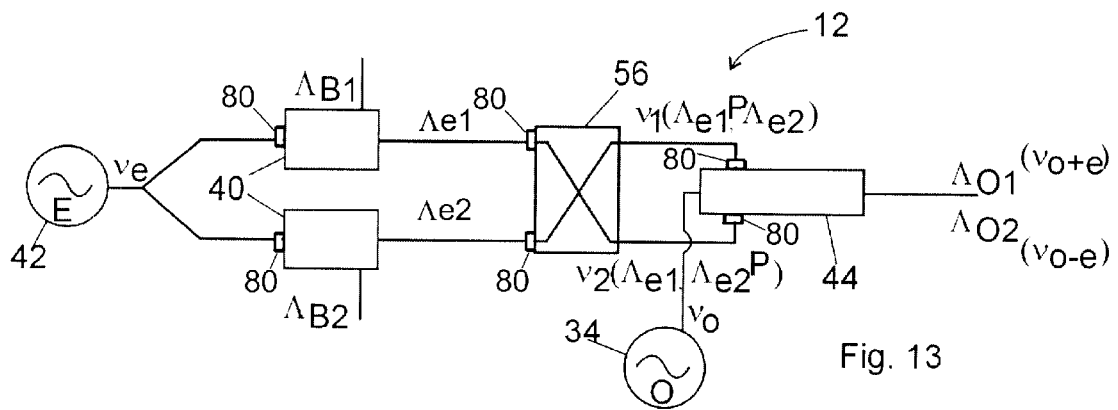
FIG. 13 shows an embodiment of upconverters of the present invention.

The upconverter 44 in embodiments of FIGS. 12 and 13 is configured to upconvert the electrical signal onto a single sideband subcarrier frequency, either $v_{o+e}$ or $v_{o-e}$, while suppressing the mirror image sideband subcarrier frequency. The upconverter can be operated without or with carrier wavelength suppression, although carrier suppression eliminates unwanted signals that could produce signal interference.

FIG. 13 illustrates an embodiment of the present invention in which the transmitter 12 can be used to symmetrically place two different optical signals around the central wavelength $\lambda_o$ of the optical carrier. The electrical carrier 42 supplies the electrical carrier $v_e$ that is split into two paths, each of which is modulated using a corresponding modulator $36_1$ or $36_2$ with electrical baseband signals $\Lambda_{B1}$ and $\Lambda_{B2}$, respectively. The two signals are passed through the electrical coupler 56 which splits and couples the signals from each of the two coupler input paths to each of the two output paths. The coupler 56 introduces a 90° phase shift into the coupled portion of the signal, shown as $\Lambda_{e1}^P$ and $\Lambda_{e2}^P$ on FIGS. 12 and 13, to produce upconverter input signals $v_1$ and $v_2$. For example in FIG. 13, $v_1$ includes $\Lambda_{e1}^P$ and $\Lambda_{e2}$, whereas $v_2$ includes $\Lambda_{e1}$, and $\Lambda_{e2}^P$. The opposite phase shifts of $v_1$ and $v_2$ results in one of the two electrical signals being upconverted onto an optical subcarrier frequency $v_{o+e}$. The other electrical signal is upconverted onto the optical subcarrier frequency $v_{o-e}$, symmetric to the optical carrier frequency $\lambda_o$. A skilled artisan will recognize that distorted and undistorted optical signals can be produced using the embodiment of FIG. 13 and similar embodiments.

Figure 14:
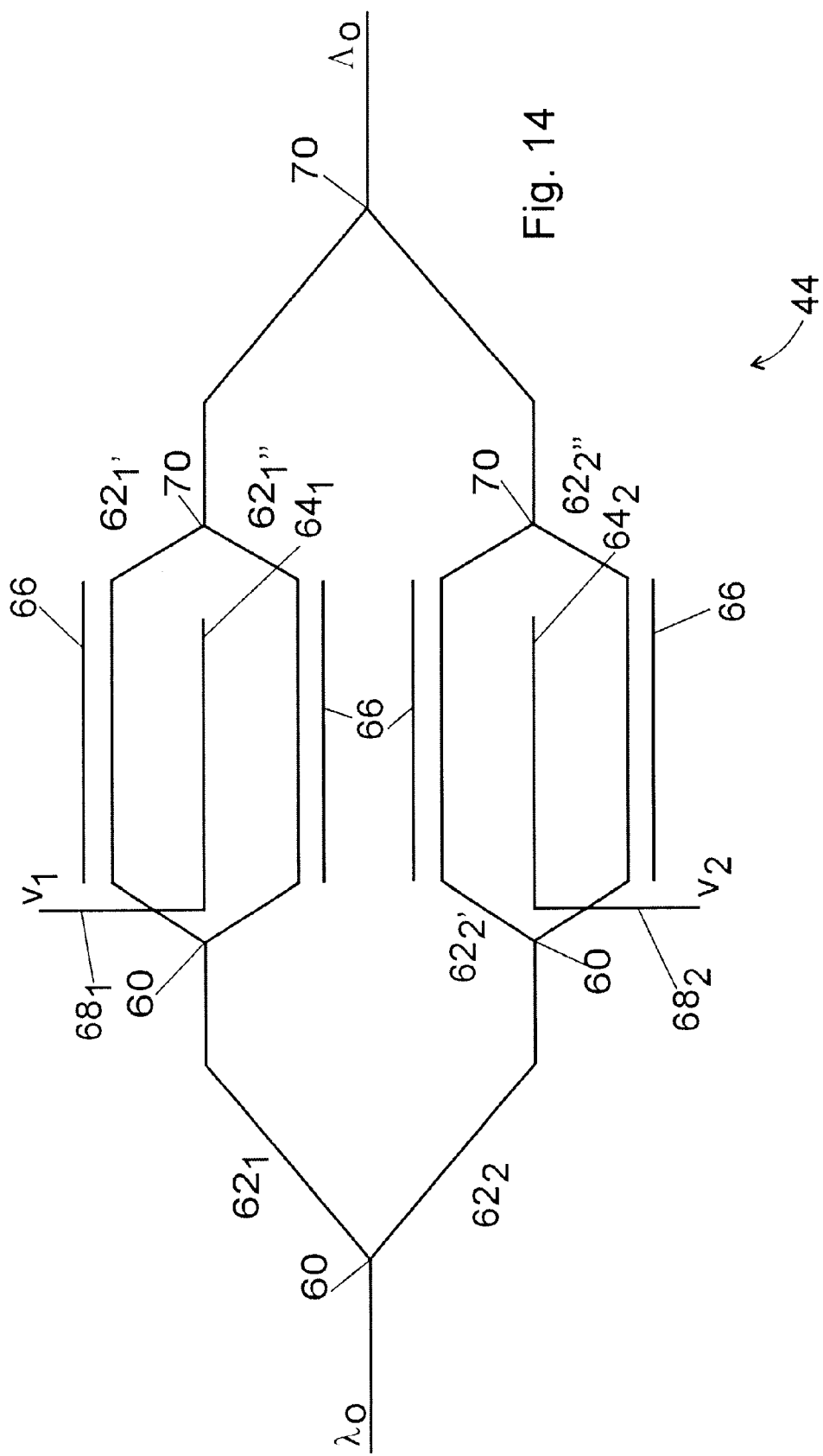
FIGS. 14–16 show embodiments of transmitters of the present invention.

FIG. 14 illustrates an embodiment of a single side band suppressed carrier upconverter 44 suitable for use in the present invention. Other suitable single side band embodiments include those described by Olshansky in U.S. Pat. Nos. 5,101,450 and 5,301,058, which are incorporated herein by reference. The optical carrier lightwave at frequency $v_o$ is split using an optical splitter 60 into two respective optical paths, $62_1$ and $62_2$, which are further split into optical paths $62_{1'}$ and $62_{1''}$. The split lightwaves in optical paths $62_1$ are passed between first upconverter input electrode $64_1$ and a pair of ground electrodes 66. Likewise, the split lightwaves in optical paths $62_2$ are passed between second upconverter input electrode $64_2$ and a pair of ground electrodes 66. Electrical input signals $v_1$ and $v_2$ are provided to the upconverter respective input electrodes $64_1$ and $64_2$ via first and second inputs, $68_1$ and $68_2$, respectively. The input signals $v_1$ and $v_2$ are upconverted onto the respective split lightwaves passing between the electrodes and combined in cascaded optical combiners 70 to produce the upconverted optical signal $\Lambda_o$.

$LiNbO_3$ can be used to form the optical paths $62_{i'}$ and $62_{i'''}$, which can be used to produce linearly polarized optical signals. In addition, bias electrodes can be provided in optical paths $62_{i'}$ and $62_{i'''}$ and/or $62_i$ after passing through the input electrodes $64_i$ and $64_2$. The bias electrodes can be used to trim the phase difference of the optical signals upconverted onto the subcarrier lightwaves in each path before the signals are combined.

The electrical input signals $v_1$ and $v_2$ introduced to the upconverter 44 carrying the same electrical data signal, except that the data signals have a relative phase shift between the first and second inputs, $68_1$ and $68_2$, according to the relation: $v_1=v_2\pm$phase shift. The sign of the phase shift determines whether the electrical data signal will be upconverted onto lightwave subcarriers that are greater or less than the carrier frequency of the lightwave. Thus, the upconverter 44 can be configured to receive and simultaneously upconvert electrical signals at the same or different electrical frequencies onto different subcarrier lightwave frequencies of the same lightwave by introducing the appropriate phase shift between the electrical input signals. For example, in embodiments of FIGS. 12 and 13, 3 dB electrical couplers 56 provide a $\pm 90°$ phase shift, which allows electrical signals to be upconverted onto optical frequencies that are greater or less than the carrier frequency. One skilled in the art will appreciate that other techniques for imparting the phase shift are suitable within the scope of the invention.

Figure 15:
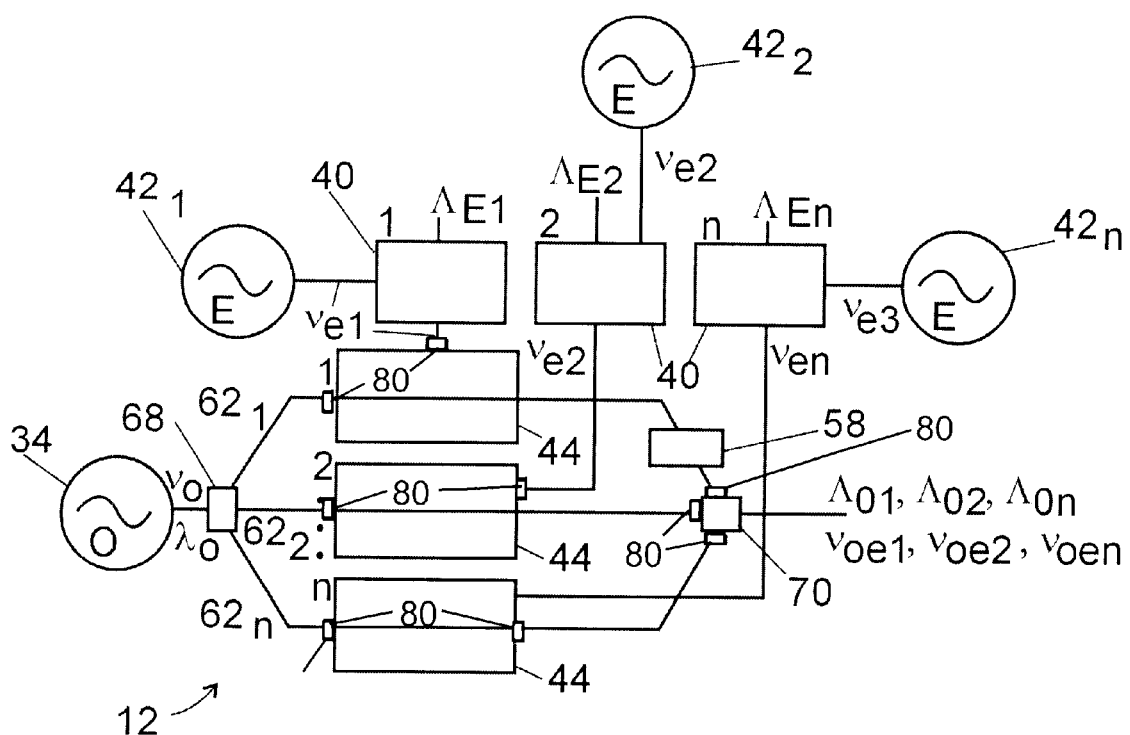

FIG. 15 illustrates an embodiment of the transmitter 12, which can be to used provide control over proximate optical wavelengths by upconverting one or more electrical frequencies onto a plurality of optical carriers provided by the common optical source 34. The optical carrier lightwave is split using the optical splitter 60 into split lightwaves carried on a plurality of optical paths $62_1$–$62_n$. A corresponding plurality of the upconverters $44_{1-n}$ are disposed along the optical paths. A plurality of electrical baseband signal $\Lambda_{B1}$–$\Lambda_{Bn}$ are correspondingly modulated onto electrical carrier $v_{e1}$–$v_{en}$ via modulators $40_{1-n}$. The electrical carrier signals $v_{e1}$–$v_{en}$ are provided to the upconverters $44_{1-n}$ and converted to subcarrier lightwave optical signals $\Lambda_{o1}$–$\Lambda_{on}$ at frequencies $v_{oe1}$–$v_{oen}$ and combined using an optical combiner or multiplexer 68. When only one electrical signal is upconverted onto a split lightwave optical carrier in a path $62_i$, single or double sideband upconverters, with or without carrier suppression, can be used in the invention. Optical filters 58 can be employed to remove any undesired remnant carrier wavelengths or mirror image sidebands that are output from the particular modulator used in the transmitter 12.

Figure 16:
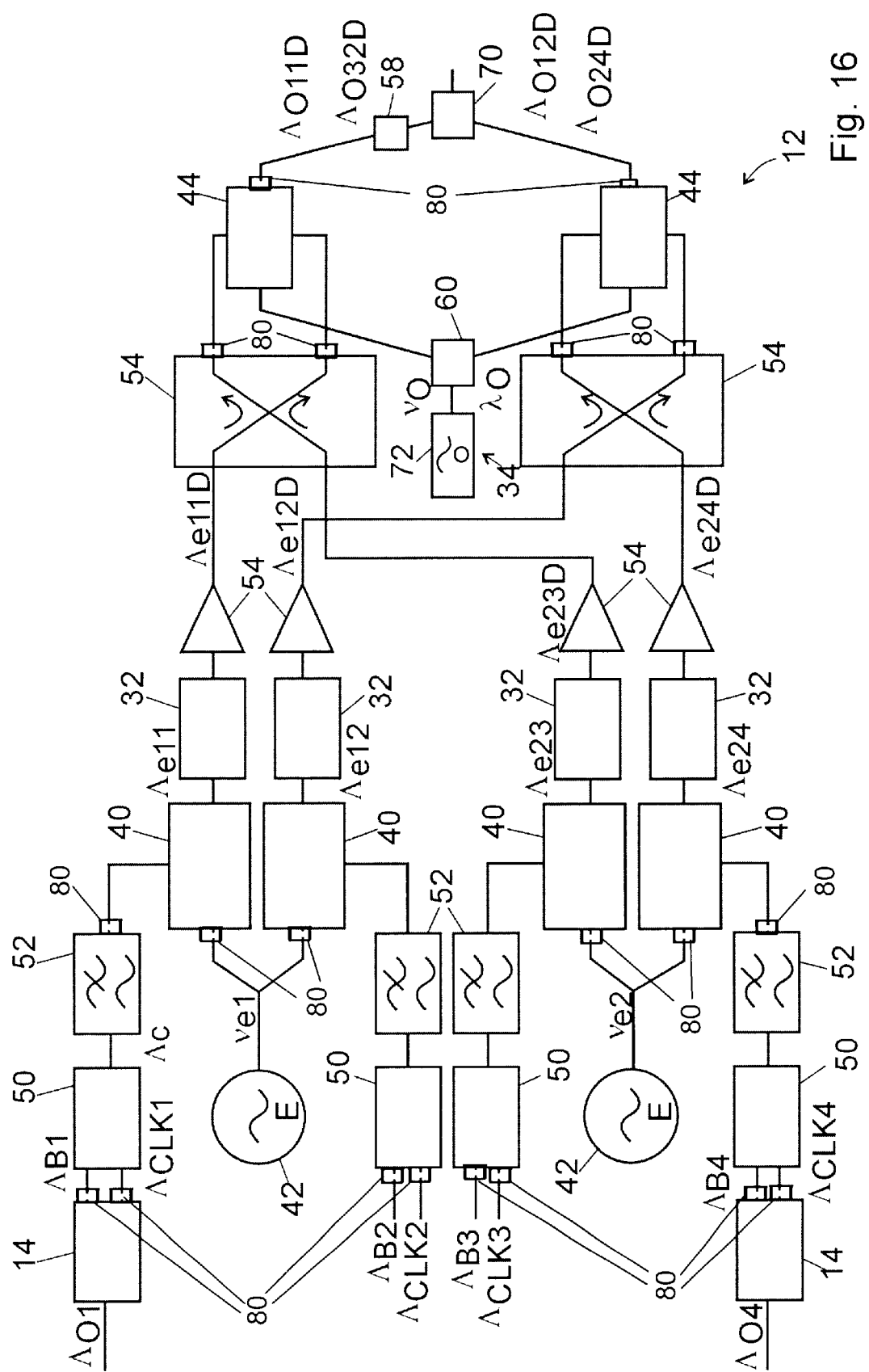

FIG. 16 shows an embodiment of the transmitter 12 that is configured to transmit four optical signals using a single optical source 34, such as a laser 72, emitting the optical carrier at a central wavelength $\lambda_o$ and frequency $v_o$. The baseband electrical signal $\Lambda_{B1}$–$\Lambda_{B4}$ are provided as input to corresponding data encoders $50_{1-4}$ from an electrical transmission path or from the optical receiver 14 in a short or long reach optical system. The encoded electrical signal is passed through the shaping filter $52_{1-4}$ to respective electrical modulators 40. Encoded electrical signals $\Lambda_{C1}$–$\Lambda_{C2}$ and $\Lambda_{C3}$–$\Lambda_{C4}$ are modulated onto the electrical carrier at frequency $v_{e1}$ and $v_{e2}$, respectively. The modulated electrical signals $\Lambda_{e11}$–$\Lambda_{e24}$ are passed through respective signal distorters $321_{1-4}$ and electrical amplifiers $54_{1-4}$ to provide amplified distorted electrical signals $\Lambda_{e11D}$–$\Lambda_{e24D}$. Electrical signals $\Lambda_{e11D}$ and $\Lambda_{e23D}$ can be routed through electrical coupler $56_1$ to upconverter $44_1$. Likewise, electrical signals $\Lambda_{e12D}$ and $\Lambda_{e24D}$ can be routed through electrical coupler $54_2$ to upconverter $44_2$. The upconverted optical signals $\Lambda_{oe1D}$–$\Lambda_{oe4D}$ are combined in the combiner 62 prior to transmission. The interleaving of the electrical frequencies being upconverted allows for the use of optical filters 58, with either single or double sideband modulators, to remove any unwanted sidebands or carrier wavelengths from the optical signals $\Lambda_{oe1D}$–$\Lambda_{oe4D}$. Transmitters 12 of the present invention can also be used to modulate data onto the lightwave carrier wavelength, in addition to upconverting electrical frequency onto the lightwave.

In the present invention, transmitters 12 configured to provide multiple optical signals, can be further configured to impart opposite polarization to pairs of optical signals being generated by upconverting the electrical signals. For example, the optical combiner 62 in embodiments such as those shown in FIGS. 15 and 16 can be a polarizing component, such as a polarizing beam splitter/combiner. The orthogonal polarization of adjacent signals will reduce or eliminate nonlinear interaction between the signals, thereby providing for more closely spaced signal wavelengths and high power signals.

Figure 17:
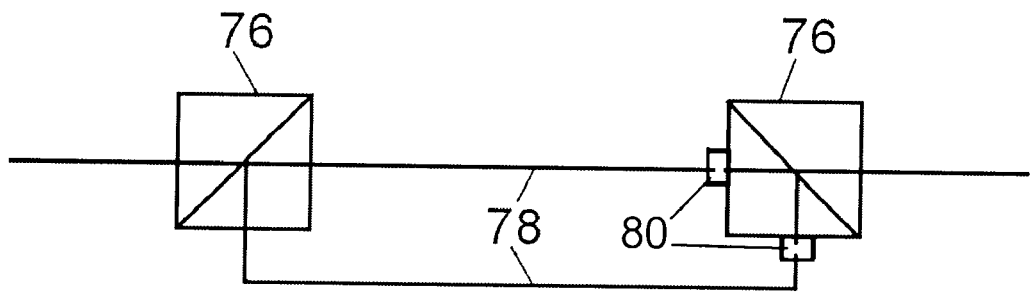
FIG. 17 shows a polarizing element of the present invention.

FIG. 17 illustrates another embodiment of the present invention including a separate polarizing element 74 in the combiner 62. One embodiment of the polarizing element 74 can include two oppositely configured polarizing beam splitters 76 connected in series by two parallel paths 78 that produce a differential travel time between the splitters 76. The first beam splitter 76 splits the optical signal into two equal amplitude polarization components. The second beam splitter 76 is used to recombine the two polarization components. The time differential introduced by the parallel paths 78 can be established and/or controlled to introduce differences in the polarization of the channels. For example, optical signals having sufficiently narrow bandwidths can be introduced to the first beam splitter 76 at a 45° polarization angle to allow optical signal power to propagate equally in both paths 78. The resulting combined signals emerging from the second splitter 76 would be orthogonal if the time differential were equal to 1/(2* frequency difference between the signals). Similarly, polarization maintaining fiber can be used in lieu of the splitters 76 and parallel path 78 to introduce the time differential between the polarization components of a linearly polarized optical signal.

Figure 18:
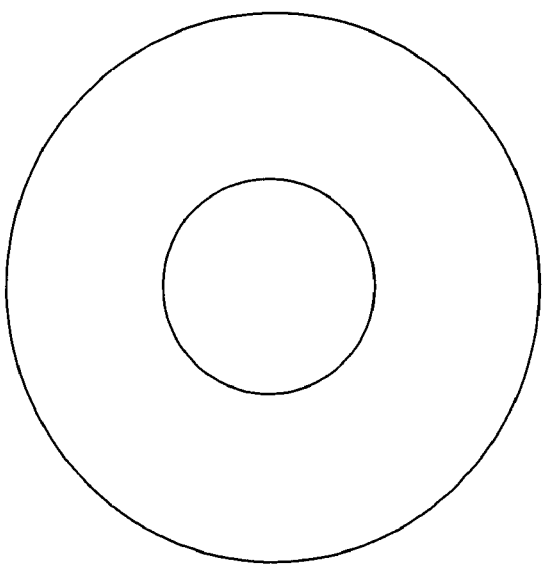
FIGS. 18 and 19 show top and side plan views, respectively, of one embodiment of the distortion element.
Figure 19:
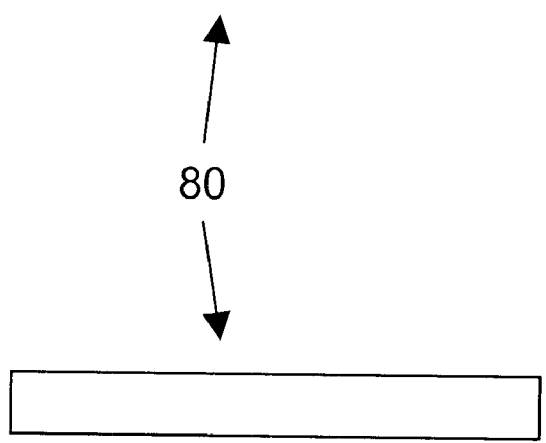

FIGS. 18 and 19 are top and side plan views, respectively, of one embodiment of the distortion element 80. The materials, dimensions, and tolerances of the distortion element 80 will vary depending on the particular application. In one example, however, the distortion element 80 may be made from 304 stainless steel, finished eletroless nickel per MIL-C-26074, class 1, grade A, 80 to 120 microinches thick, gold per MIL-G-45204, type III, CL 4, 30 microinches minimum, and having an inner diameter of about 0.0830 inches and an outer diameter of about 0.1795 inches. Although the distortion element 80 is illustrated as having a circular shape, it may also have other shapes, depending on the particular application. The shape of the distortion element 80 may be varied to properly engage or couple with the waveguide, cable, or connector with which it is being used. The thickness of the distortion element 80 may also vary, and many thickness may be desirable for a particular application so as to allow for variable distortion or tuning. In one application, the distortion element 80 may be used in thicknesses of 0.010, 0.020, 0.030, 0.040, and 0.050 inches. Other thicknesses, of course, may also be used.

Figure 20:
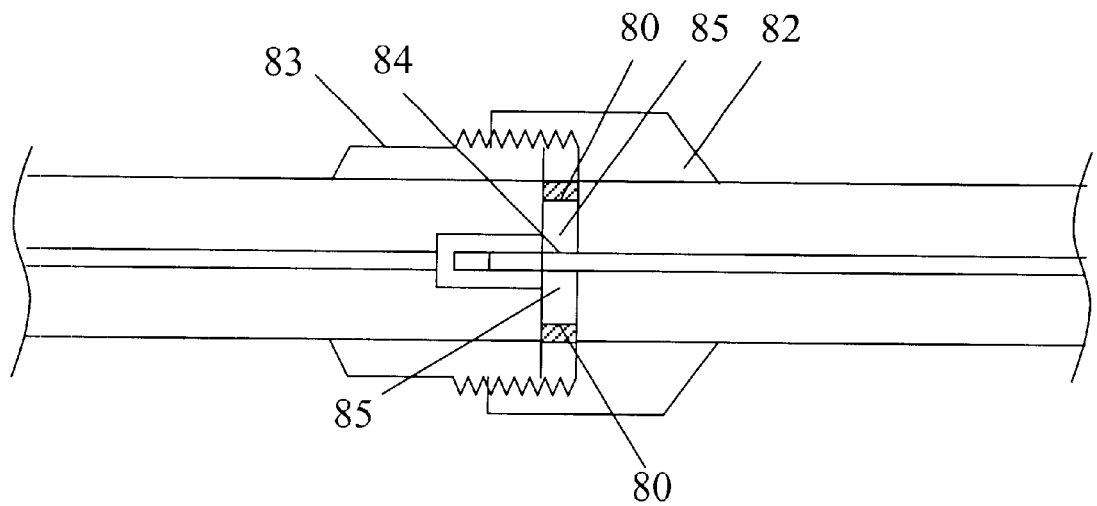
FIG. 20 shows a distortion element in combination with electrical connectors.

FIG. 20 is a cross-sectional view of a distortion element 80 in an assembly with connectors 82, 83. In that embodiment, the connectors 82, 83 are illustrated as SMA connectors, although advantages of the present invention may be realized with any connector. The assembly is electrically coupled via an electrical conductor 84 which passes through the distortion element 80. An electrical insulator 85 may be provided between the distortion element 80 and the electrical conductor 84. Alternatively, the insulator 85 may be eliminated and/or the distortion element may form part of the electrical path between the conductors. In the illustrated embodiment, the distortion element 80 is between the male connector 82 and the female connector 83. The distortion element 80 separates the connectors 82, 83 while still allowing for an electrical connection, thereby changing the effective length of the cable.

The distortion element 80 may be modified for different applications. In one such embodiment, the opening in the distortion element 80 is designed to maintain a 50 ohm line through the distortion element 80. If the opening, and therefore the dielectric, is air, the dimensions for a 50 ohm line will be different from that of a coaxial cable. Alternatively, if an electrical insulator 85 is placed in the opening, a different dimension will be needed to maintain a 50 ohm line. As a result, the inner dimension of the distortion element 80 may be modified for the particular applications of the present invention. Similarly, the outer dimension of the distortion element 80 can be selected so as to minimize movement in the connectors 82, 83 while allowing ease and repeatability during insertion of the distortion element 80.

Figure 21:
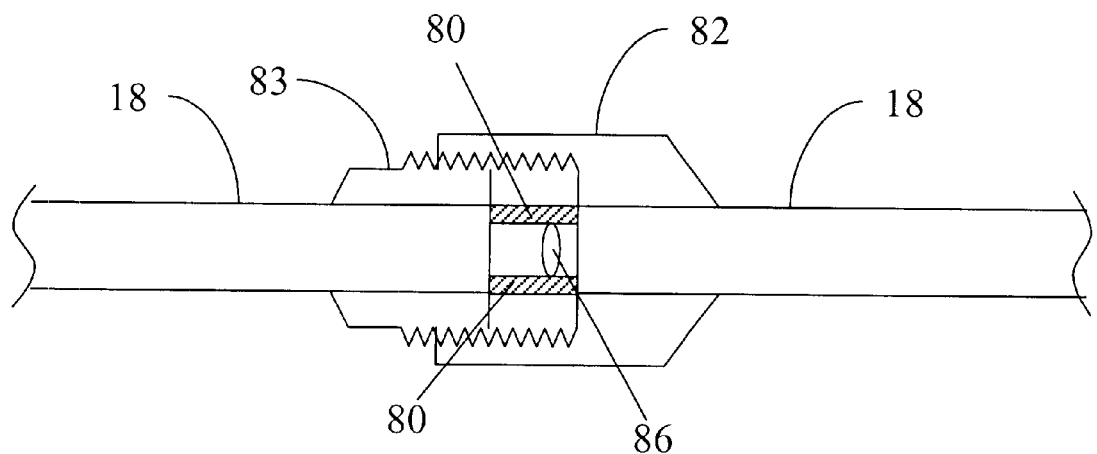
FIG. 21 shows a distortion element in combination with an optical waveguide.

FIG. 21 illustrates another embodiment of the distortion element 80 assembly used with a pair of optical waveguides 18. In that embodiment, the distortion element 80 affects the effective length of the optical waveguides 18, thereby allowing for selective tuning or distortion. In another embodiment, the opening defined by the distortion element 80 may include a lens 86 or some other device for focusing or otherwise distorting the optical energy carried in the optical waveguides 18. In another embodiment, one of the waveguides may be replaced with another component, such as a photodiode, and the assembly may include other components, such as a lens external to the distortion element 80.

It will be appreciated that the present invention provides for optical systems having increasing the number of channels and the transmission performance of optical systems. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An optical transmission system comprising:
   an optical transmitter, including an electrical data signal input terminal and an optical signal output terminal;
   an optical receiver including an optical signal input terminal;
   an optical waveguide optically coupling the optical transmitter and the optical receiver;
   an electrical cable electrically coupled to the electrical data signal input terminal of the transmitter; and
   a mechanical signal distortion element series-connected to one of the electrical cable and the optical waveguide, wherein the distortion element is circular, defines an opening therethrough, and is connected to one of the electrical cable and the optical waveguide such that energy from one of the electrical cable and optical waveguide passes through the opening defined by the distortion element.

2. The system of claim 1, wherein the mechanical signal distortion element changes the effective length of one of the electrical cable and the optical waveguide.

3. The system of claim 1, wherein the optical transmitter includes a plurality of electrical data signal input terminals, the system includes a plurality of electrical cables electrically connected to the plurality of electrical data signal input terminals, and the system includes a plurality of mechanical signal distortion elements series-connected to the plurality of electrical cables.

4. The system of claim 3, wherein each of the plurality of mechanical signal distortion elements has a thickness, and wherein there are a plurality of different distortion element thicknesses.

5. The system of claim 3, wherein at least one of the mechanical signal distortion elements is between one of the electrical cables and one of the electrical data signal input terminals.

6. The system of claim 1, wherein the optical transmitter includes a plurality of optical signal output terminals, the optical receiver includes a plurality of optical signal input terminals, the system includes a plurality of optical waveguides optically coupling the optical transmitter to the optical receiver, and the system includes a plurality of mechanical signal distortion elements series-connected to the plurality of waveguides.

7. The system of claim 6, wherein each of the plurality of mechanical signal distortion elements has a thickness, and wherein there are a plurality of different distortion element thicknesses.

8. The system of claim 6, wherein at least one of the mechanical signal distortion elements is between one of the optical waveguides and one of the optical signal input terminals.

9. The system of claim 6, wherein at least one of the mechanical signal distortion elements is between one of the optical waveguides and one of the optical signal output terminals.

10. The system of claim 1, wherein the distortion element is connected to the electrical cable, wherein an electrical conductor from the electrical cable is disposed within the opening defined by the distortion element, and further comprising a first electrical connector electrically coupled to the electrical cable.

11. The distortion assembly of claim 10, further comprising an electrical insulator between the distortion element and the electrical conductor.

12. The distortion assembly of claim 10, further comprising a second electrical connector electrically coupled to the first electrical connector via the electrical conductor.

13. The distortion assembly of claim 10, further comprising a second electrical connector electrically coupled to the first electrical conductor.

14. The system of claim 1, wherein the distortion element is connected to the optical waveguide and further comprising:
   an optical lens in an optical path of optical energy emerging from the optical waveguide; and
   an optical component at the focal point of the lens.

15. The system of claim 14, wherein the optical component is a photodiode.

16. The system of claim 14, wherein the optical component is another optical waveguide.

\* \* \* \* \*